July 24, 1956　　　E. R. BECKESH　　　2,755,591
FISHING LURE
Filed May 18, 1955

INVENTOR.
Eugene R. Beckesh.
BY
Harness, Dickey & Pierce
ATTORNEYS.

United States Patent Office 2,755,591
Patented July 24, 1956

2,755,591

FISHING LURE

Eugene R. Beckesh, Lincoln Park, Mich.

Application May 18, 1955, Serial No. 509,245

8 Claims. (Cl. 43—42.5)

This invention relates to new and useful improvements in fishing lures.

An important object of the invention is to provide a fishing lure that will travel below the surface of the water and that will wobble or dart from side to side and up and down in a manner simulating in realistic fashion the antics of a minnow or other aquatic creature on which fish and particularly game fish habitually feed.

Another object of the invention is to provide a fishing lure that can be easily and relatively inexpensively constructed of readily available materials.

Other objects and advantages of the invention will be apparent during the course of the following description.

Figure 1:
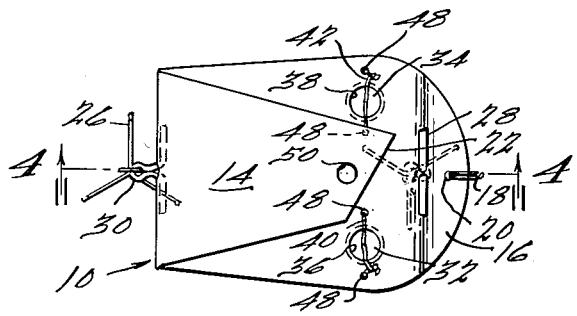
Figure 2:
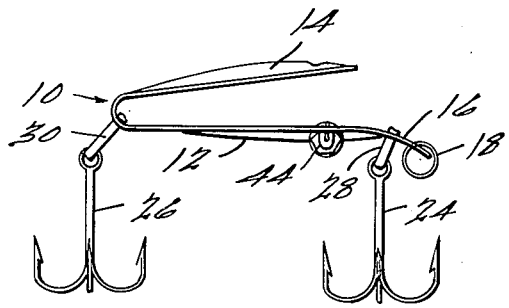
Figure 3:
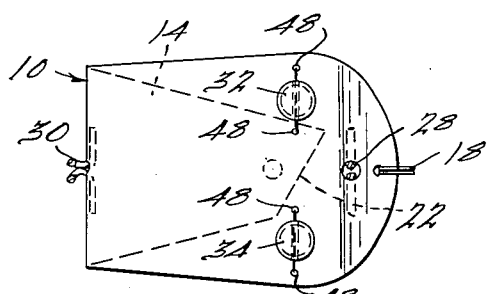
Figure 4:
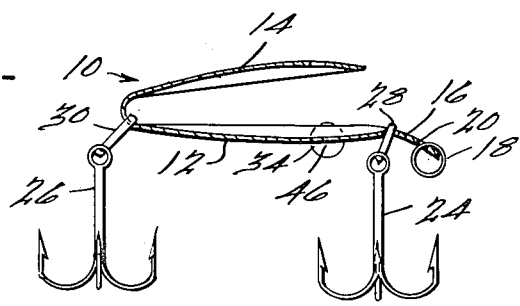

In the drawing forming a part of this specification and wherein like numerals are employed to designate like parts throughout the same, Fig. 1 is a top plan view of a fishing lure embodying the invention, Fig. 2 is a side elevational view of the same, Fig. 3 is a bottom plan view thereof, and Fig. 4 is a longitudinal sectional view taken on the line 4—4 of Fig. 1.

Considered in certain of its broader aspects, the lure embodying the instant invention comprises an elongated, rearwardly tapered body 10 of sheet metal bent transversely into a generally U shape, as shown in Figs. 2 and 4. This particular conformation provides a relatively large lower portion 12 and a relatively small upper portion 14. The lower portion 12 is downwardly dished or concaved and the upper portion 14 is upwardly dished or concaved. Also, it will be observed that the leading edge of the upper portion 14 terminates short of the leading edge of the lower portion 12 so that the latter projects substantially beyond the former. It is significant that the dished area of the lower portion 12 terminates short of the leading edge, and the forward marginal portion thereof is bent angularly downwardly to form a flange 16. An attaching ring 18 is fastened in an opening 20 provided in the flange 16, and the ring is adapted for attachment to a fishing line, not shown, preferably through a swivel connection (not shown) or other conventional means. As clearly shown in Figs. 2 and 4, the upper and lower portions 12 and 14 are forwardly slightly divergent and the upper portion 14 has a straight forward edge 22 inclined to the longitudinal axis of such upper portion.

Hooks 24 and 26 are fastened to the body 10 adjacent the front and rear of the lower portion 12 in any suitable or conventional manner. In the form of the invention here shown the forward hook 24 is fastened to the lower body portion 12 at substantially the juncture of the concaved area and the flange 16 by a cotter pin 28. The rear hook 26 is similarly fastened at the rear of the lure substantially at the juncture of the upper and lower body portions 12 and 14 by a cotter pin 30. Both hooks 24 and 26 preferably are located at substantially the longitudinal center of the lure, and the hooks dangle loosely so that when the lure is pulled through the water they trail downwardly and rearwardly from the body 10.

Beads 32 and 34 are attached to the undersurface of the lower body portion 12 preferably adjacent the forward end of the lure and equidistantly from opposite sides of the longitudinal axis thereof. In the form of the invention shown, the beads 32 and 34 are set into holes 36 and 38 formed in the body portion 12 and are fastened to the body in any suitable or conventional manner. In the drawing the beads 32 and 34 are shown attached to the body by wires 40 and 42 which extend through holes 44 and 46 conventionally provided in the beads and through holes 48 provided in the body of the lure. The beads 32 and 34 are larger than the holes 36 and 38 and the size relationship is such that while the main portions of the beads are disposed below the body of the lure they are in effect set into the body. In this manner the beads 32 and 34 simulate eyes on the undersurface of the lure and provide bright colored objects which attract fish to the lure.

A hole 50 preferably is provided adjacent the forward end of the upper body portion 14. If desired, bait or bright-colored feathers or streamers can be attached to the lure through the hole 50 as a further attraction to the fish. In this manner the basic characteristics of the lure can be almost infinitely modified according to the exigencies of the particular situation and the ingenuity of the fisherman.

The lure preferably is used either by casting or by trolling. In either event, of course, the lure is pulled through the water either in a continuous, uniform motion or in a series of jerks and starts. Regardless of the manner of pulling the lure through the water, however, the downwardly bent forward flange 16 deflects the lure downwardly and tends to prevent it from rising to the surface of the water. The concaved areas of the body portions 12 and 14 cause the lure to roll or wobble as it moves through the water, and this action is enhanced and modified by the forwardly divergent relation between the two body portions. The action of the lure is further modified by the inclined edge 22 which causes it to dart suddenly to one side or the other, depending upon the rolling position of the lure as determined by the concaved areas, the angle at which the water is forced between the body portions 12 and 14, and the pull of the line on the lure. The total effect is a lure which bobs up and down below the surface of the water while simultaneously rolling or wobbling and occasionally darting from side to side. This action has proved to be exceedingly effective in attracting fish to the lure and in causing them to strike at the lure.

Having thus described the invention, I claim:

1. A fishing lure having an elongate rearwardly tapered body of sheet material bent transversely into a generally U shape intermediate the ends thereof to provide upper and lower body portions, said body portions being forwardly divergent and oppositely concaved, said lower body portion extending forwardly of said upper body portion and being provided with an angularly downwardly bent forward flange, said upper portion having a forward edge inclined to the longitudinal axis of the body.

2. A fishing lure having a body of sheet material provided with forwardly divergent upper and lower portions, said lower portion being larger than said upper portion and extending forwardly thereof and said lower portion having an angularly downwardly directed transverse flange at its forward end, said lower body portion being downwardly concaved and said upper body portion being upwardly concaved.

3. A fishing lure having a generally U-shaped body of sheet material defining upper and lower body parts, one of said body parts having a forwardly and downwardly inclined transverse flange portion which acts in use to deflect the lure downwardly, said body parts being forwardly divergent and oppositely concaved to provide surfaces which cause the lure to roll and wobble in use, and one of said body parts having an edge inclined to the longitudinal axis of the body which acts in use to deflect the lure from side to side.

4. A fishing lure having a generally U-shaped body of sheet material defining upper and lower parts, said lower body part being larger than said upper body part and having a forwardly and downwardly inclined transverse flange portion which acts in use to deflect the lure downwardly, said body parts being forwardly divergent and oppositely concaved to provide surfaces which cause the lure to roll and wobble in use, and one of said body parts having an edge inclined to the longitudinal axis of the body which acts in use to deflect the lure from side to side.

5. A fishing lure having a generally U-shaped body of sheet material defining upper and lower body parts, one of said body parts having a forwardly and downwardly inclined transverse flange portion which acts in use to deflect the lure downwardly, said body parts being forwardly divergent and oppositely concaved to provide surfaces which cause the lure to roll and wobble in use, and said upper body part having a forward edge inclined to the longitudinal axis of the body which acts in use to deflect the lure from side to side.

6. A fishing lure having a generally U-shaped body of sheet material defining generally upper and lower body parts, said lower body part being larger than said upper body part and projecting forwardly of said upper body part, the projecting portion of said lower body part provided with a downwardly inclined transverse flange portion which acts in use to deflect the lure downwardly, said body parts being forwardly divergent and oppositely concaved to provide surfaces which cause the lure to roll and wobble in use, and said upper body part having an edge inclined to the longitudinal axis of the body which acts in use to deflect the lure from side to side.

7. A fishing lure having a generally U-shaped body of sheet material defining generally upper and lower body parts, said lower body part being larger than said upper body part and projecting forwardly of said upper body part, the projecting portion of said lower body part provided with a downwardly inclined transverse flange portion which acts in use to deflect the lure downwardly, said body parts being oppositely concaved to provide surfaces which cause the lure to roll and wobble in use, and said upper body part having an edge inclined to the longitudinal axis of the body which acts in use to deflect the lure from side to side.

8. A fishing lure having a generally U-shaped body of sheet material defining generally upper and lower body parts, said lower body part being larger than said upper body part and projecting forwardly of said upper body part, the projecting portion of said lower body part provided with a downwardly inclined transverse flange portion which acts in use to deflect the lure downwardly, said body parts having transversely curved surfaces which act against the water to cause the lure to roll and wobble in use, and said upper body part having an edge inclined to the longitudinal axis of the body which acts in use to deflect the lure from side to side.

References Cited in the file of this patent

UNITED STATES PATENTS

| 1,362,586 | Ackerman | Dec. 21, 1920 |
| 1,598,958 | Crosby | Sept. 7, 1926 |
| 2,567,813 | Hyland | Sept. 11, 1951 |